Aug. 27, 1929.　　　　E. P. SEGHERS　　　　1,726,195
TRAP
Filed Jan. 22, 1926
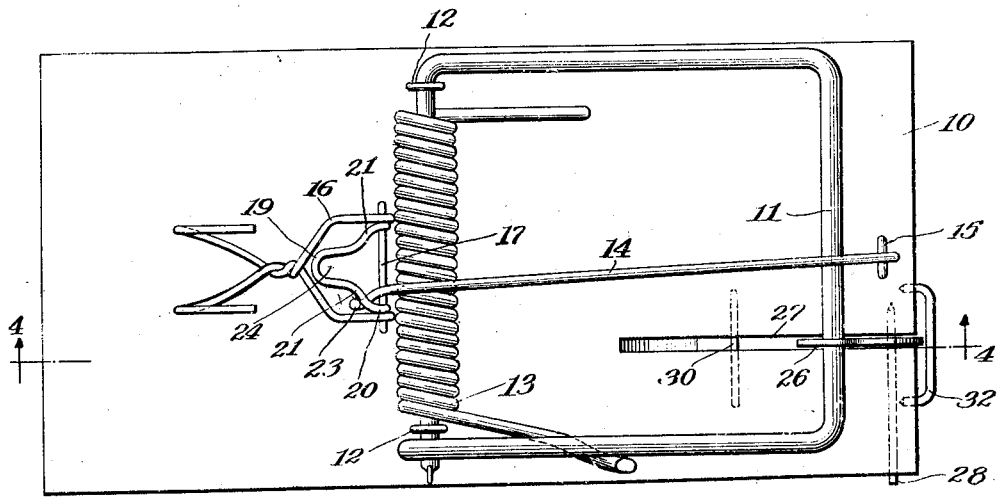
Fig. 1.
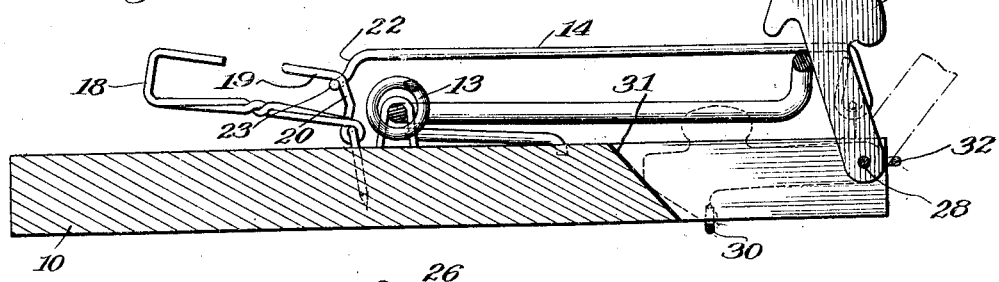
Fig. 2.
Fig. 3.
Fig. 4.
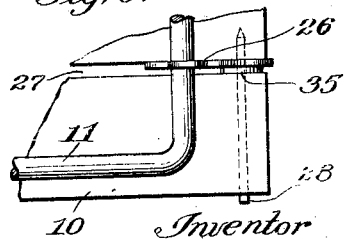
Fig. 5.
Fig. 6.
Inventor
Emiel P. Seghers
By Nissen & Crane
Attys.

Patented Aug. 27, 1929.

1,726,195

UNITED STATES PATENT OFFICE.

EMIEL P. SEGHERS, OF CHICAGO, ILLINOIS.

TRAP.

Application filed January 22, 1926. Serial No. 82,912.

This invention relates to animal traps and has for its object the provision of devices of the character named which shall be safe and convenient to set and which shall be of improved construction and operation.

The invention is exemplified in the combination and arrangement of parts shown in the accompanying drawings and described in the following specification, and it is more particularly pointed out in the appended claims.

In the drawings:

Fig. 1 is a plan view of a trap embodying one form of the present invention;

Fig. 2 is a fragmentary plan view of a modified detail;

Fig. 3 is an elevation of the detail shown in Fig. 2;

Fig. 4 is a vertical section on line 4—4 of Fig. 1;

Fig. 5 is a fragmentary section similar to Fig. 4, but showing a modified detail;

Fig. 6 is a fragmentary top plan view of a further modified detail.

Referring, first, to Figs. 1 and 4, the numeral 10 designates a wooden block or base having a jaw or fall 11 pivotally secured on the top face thereof by staples 12. A spring 13 tends to swing the jaw about its pivot into closed position in a manner well known in the art. A retainer bar or rod 14 is secured to the base 10 by a staple 15 in position to overlie the fall 11 and hold the trap set. A trigger 16 is pivoted on the base 10 by a staple 17 and engages the end of the bar 14, as shown in the drawing. The trigger 16 comprises a wire looped about the staple 17 and provided with forwardly extending hooks 18 for holding the bait, and an upwardly extending loop 19 for engaging the retainer bar 14. The sides of the loop 19 are provided with forwardly inclined portions 20 and inwardly extending substantially horizontal portions 21. The forward end of the retainer 14 is provided with a downwardly and laterally directed portion 22 provided at its end with a forwardly and laterally directed point 23.

In setting the trap, the jaw 11 is drawn backwardly against the tension of the spring 13 and the retainer 14 is placed across the jaw. The retainer is then moved downwardly through the notch 24 in the loop 19 and swung laterally until the point 23 engages the inclined leg 20. The retainer is then permitted to move upwardly with the point 23 in engagement with the leg 20. This will cause the point 23 to raise the trigger by a cam action against the leg 20 and the point 23 will be directed to a position beneath the horizontal portion 21 of the trigger so that the trigger will be held in its upper position and the retainer 14 will be held down. The trap may thus be set by manipulating the retainer 14 without the necessity of placing the fingers on the trigger. This avoids danger of catching the fingers in case the jaw is accidentally released during the setting operation.

If desired, the end of the retainer 14 may be provided with downwardly and laterally projecting portions 25 at both sides of the retainer, as shown in Figs. 2 and 3 instead of at one side only, as shown in Fig. 1. This will permit the trigger to be raised by swinging the retainer 14 to either side.

As a further precaution against accident, a safety hook 26 may be provided for engaging the fall 11 to prevent accidental springing of the trap while it is being set. To accommodate this safety device, the block 10 is provided with a slot 27 which receives the lower end of the hook 26 and in which the hook is pivotally held by a pin 28. The hook may be swung forwardly into the broken line position, shown in Fig. 4, in which it is practically inclosed in the slot 27. A projection 29 may be provided by which the hook is lifted from the slot. A cross staple 30 may be driven into the bottom face of the trap in position to extend across the slot 27 to prevent the hook from dropping through the slot. The cross staple 30 also tends to prevent the sides of the slot from springing either in or out to change the width of the slot. The end of the slot may be either perpendicular or beveled, as shown at 31. When the slot is beveled the inclined surface may be shaped to intercept the hook 26 to prevent it from dropping through the slot and the staple 30 may then be dispensed with. A second staple 32 spans the slot at the rear edge of the trap in position to limit the backward movement of the hook 26, as shown in broken lines in Fig. 4. This holds the hook in the position where it may be readily swung forward against the cross bar of the jaw 11, as shown in full lines in Fig. 4. This movement of the hook may readily be effected by the thumb while the fingers of the same hand engage the jaw to hold it in its open position. After the hook has been swung forward, it will remain in this position by gravity, and will intercept the jaw to prevent accidental closing if the jaw should be released. After the trap has been set, the hook will be returned to the broken line position shown in Fig. 4 to leave the jaw free to operate when the trap is sprung.

There is a great advantage in the arrangement of the slot for receiving the safety hook when the trap is not in use. If the hook is permitted to remain in an upright position during shipment and while the trap is on sale, there is danger that the hook will be accidentally bent laterally so as to impair its usefulness. If the hook cannot be folded down, it interferes greatly with boxing and packing of the traps for shipment but where it can be swung into a slot, as shown in broken lines in Fig. 4, it will not project any farther than the regular trap equipment so that the same sized packing boxes may be used as are required for the traps without the safety mechanism.

Instead of the staple 32 extending across the rear edge of the slot 27, a plate 33 may be inserted in the block to extend across the slot beneath the lower end of the safety hook 26. The lower end of the safety hook will then be provided with a cam-shaped portion 34 which will limit the backward movement of the hook and will also provide frictional engagement to prevent the hook from accidental swinging movement about its pivot pin 28. The plate 33 is preferably made to frictionally engage the hook throughout its entire arc of movement so that the hook will be retained in its forward position even though the trap should be tilted backwardly. The shoulder 34 limits the backward movement. Frictional resistance against accidental swinging of the hook may also be provided by inserting a washer 35 at one side of the lower end of the hook in position to frictionally bear against the hook and the side of the slot 27, as shown in Fig. 6.

In the form of the invention shown in Fig. 1 where the safety catch works loosely in its slot it will be automatically thrown forwardly into folded position in the slot by the jar of the jaw whenever the trap is sprung. This insures return of the hook to its folded position and insures against accidental bending or breaking of the hook should the trap be stepped on or otherwise engaged by any object that might injure the hook.

Where the safety catch fits loosely in the slot, as shown in Fig. 1, it may be moved into engagement with the opened jaw by tipping the trap so that the catch falls by gravity against the cross-bar 45.

I claim:

1. The combination with a trap comprising a base having a recess therein, of a safety catch for said trap, said catch being movable into a compacted position within said recess.

2. The combination with a trap having a base provided with a slot, of a safety catch for said trap comprising a plate having a hook formed thereon, said catch being pivoted in said slot and movable about its pivot into a compacted position within said slot.

3. A trap comprising a base plate, a jaw member pivotally mounted on said base plate, trigger mechanism for holding said jaw member in set position, said base plate having a slot therein, and a safety catch pivotally mounted in said slot, said catch being foldable into compacted position within said slot.

4. A trap comprising a base, a jaw member hinged to said base, trigger mechanism for holding said member in set position, a safety catch pivoted to said base and arranged to swing in one direction into folded relation relative to said base, and a stop for limiting the movement of said safety catch in the opposite direction and arranged to retain said catch adjacent the path of movement of said jaw member.

5. A trap comprising a base having a slot therein, a safety catch pivoted in said slot and foldable into compacted position within said slot, a stop for preventing said safety catch from passing through said slot in one direction, and a second stop for limiting the movement of said safety catch in the opposite direction.

6. A trap comprising a base, a jaw member pivoted on said base, trigger mechanism for holding said jaw member in set position, a safety catch for said trap movable into and out of the path of said jaw member, and friction means comprising a spacer at one side of said safety catch for holding said safety catch against accidental displacements.

7. A trap comprising a base having a slot therein, a jaw member pivoted on said base, trigger mechanism for holding said jaw member in set position, a safety catch comprising a plate having a hook formed thereon, said catch being pivoted in said slot, said plate being of less thickness than said slot, and means for supplementing the thickness of said plate at one portion thereof within said slot to provide frictional resistance to the movement of said safety catch.

8. A trap comprising a base having a slot therein, a safety catch pivoted in said slot, and a stop extending across said slot and frictionally engaging said safety catch, said catch having means thereon for engaging said stop to limit the movement of said catch in one direction.

9. A trap comprising a base, a jaw pivotally mounted on said base, trigger mechanism for holding said jaw member in set position, said base having a slot therein, a safety catch pivotally mounted in said slot, said slot being wider than said catch to permit said catch to move freely into folded position in said slot, and means for retaining said safety catch in operative position projecting from said slot.

10. A trap comprising a base, a jaw mounted on said base, trigger mechanism for holding said jaw in set position, said base having a slot therein, a safety catch pivotally mounted in said slot, said slot being wider than said catch to permit said catch to be folded freely into said slot, and a spacer at one side of said catch adjacent the pivot thereof for frictionally holding said catch in operative position projecting from said slot.

In testimony whereof I have signed my name to this specification on this 19th day of January, A. D. 1926.

EMIEL P. SEGHERS.